US010157697B2

(12) United States Patent
Toyama et al.

(10) Patent No.: US 10,157,697 B2
(45) Date of Patent: Dec. 18, 2018

(54) METHOD FOR MANUFACTURING A WIRE HARNESS

(71) Applicant: MITSUBISHI AIRCRAFT CORPORATION, Aichi (JP)

(72) Inventors: Koji Toyama, Tokyo (JP); Hitoshi Kurahashi, Tokyo (JP); Yoshifumi Ikeda, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 237 days.

(21) Appl. No.: 14/977,961

(22) Filed: Dec. 22, 2015

(65) Prior Publication Data

US 2016/0225492 A1    Aug. 4, 2016

(30) Foreign Application Priority Data

Feb. 2, 2015    (JP) .................................. 2015-018393

(51) Int. Cl.
*H01R 43/00* (2006.01)
*H01B 13/012* (2006.01)
*G06F 17/50* (2006.01)

(52) U.S. Cl.
CPC ... *H01B 13/01227* (2013.01); *G06F 17/5095* (2013.01)

(58) Field of Classification Search
CPC ...................... H01B 13/01227; G06F 17/5095
See application file for complete search history.

(56) References Cited

U.S. PATENT DOCUMENTS

| | | | | |
|---|---|---|---|---|
| 3,693,228 A * | 9/1972 | Logan | .............. | H01B 13/01245 29/56.6 |
| 4,190,890 A * | 2/1980 | Marx | ............... | H01B 13/01227 29/720 |
| 4,711,025 A * | 12/1987 | DeSanto | .................. | F16L 3/08 174/72 A |
| 4,757,606 A * | 7/1988 | Eaton | ..................... | H01R 43/20 29/742 |
| 8,066,383 B2 * | 11/2011 | Lin | ........................ | H01R 43/28 29/720 |
| 8,225,498 B2 * | 7/2012 | Lin | .................. | H01B 13/01227 29/745 |
| 8,442,664 B1 * | 5/2013 | Guglielmo | ............. | H01R 43/28 29/33 M |
| 9,536,457 B2 * | 1/2017 | Cox | ...................... | G09F 27/008 |

FOREIGN PATENT DOCUMENTS

JP    2012-252977 A    12/2012

* cited by examiner

*Primary Examiner* — Paul D Kim
(74) *Attorney, Agent, or Firm* — Pearne & Gordon LLP (57) ABSTRACT

The present invention provides a wire harness manufacturing support system including: a worktable on which a plurality of electric wires constituting a wire harness are wired; and a database that holds wiring route data corresponding to each wire of the plurality of electric wires. The wire harness manufacturing support system is configured so that wiring routes are sequentially displayed on the worktable based on the plurality of wiring route data held in the database.

13 Claims, 14 Drawing Sheets

| No. | FORM ID : F-01 ||
| --- | --- | --- |
| | HARNESS ID | CONNECTOR ID |
| 1 | 123-A | CC-1 |
| 2 | 123-B | CC-2 |
| 3 | 123-C | CC-3 |
| 4 | 123-D | CC-4 |

⋮

| No. | FORM ID : F-02 ||
| --- | --- | --- |
| | HARNESS ID | CONNECTOR ID |
| 1 | 234-A | CD-1 |
| 2 | 234-B | CD-2 |
| 3 | 234-C | CD-3 |
| 4 | 234-D | CD-4 |

| HARNESS ID : 123-A | | |
|---|---|---|
| No. | WIRE ID | WIRING ROUTE |
| 1 | W-1a | (x1, y1)-(x2, y2)-(x3, y3) |
| 2 | W-1b | (x1, y1)-(x2, y2)-(x3, y3) |
| 3 | W-1c | (x1, y1)-(x2, y2)-(x3, y3) |
| 4 | W-2a | (x4, y4)-(x5, y5)-(x6, y6) |
| 5 | W-2b | (x4, y4)-(x5, y5)-(x6, y6) |
| 6 | W-2c | (x4, y4)-(x5, y5)-(x6, y6) |
| 7 | W-2d | (x4, y4)-(x5, y5)-(x6, y6) |
| 8 | ⋮ | ⋮ |
| 9 | ⋮ | ⋮ |
| 10 | ⋮ | ⋮ |

| HARNESS ID : 123-B | | |
|---|---|---|
| No. | WIRE ID | WIRING ROUTE |
| 1 | W-11a | (x11, y11)-(x12, y12)-(x13, y13) |
| 2 | W-11b | (x11, y11)-(x12, y12)-(x13, y13) |
| 3 | W-11c | (x11, y11)-(x12, y12)-(x13, y13) |
| 4 | W-21a | (x14, y14)-(x15, y15)-(x16, y16) |
| 5 | W-21b | (x14, y14)-(x15, y15)-(x16, y16) |
| 6 | W-21c | (x14, y14)-(x15, y15)-(x16, y16) |
| 7 | W-21d | (x14, y14)-(x15, y15)-(x16, y16) |
| 8 | ⋮ | ⋮ |
| 9 | ⋮ | ⋮ |
| 10 | ⋮ | ⋮ |

FIG. 5

| CONNECTOR ID : CC-1 | | |
|---|---|---|
| No. | PIN ID | CONNECTION-DESTINATION WIRE |
| 1 | C-1a | W-1a |
| 2 | C-1b | W-1b |
| 3 | C-1c | W-1c |
| 4 | C-2a | W-2a |
| 5 | C-2b | W-2b |
| 6 | C-2c | W-2c |
| 7 | C-2d | W-2d |
| 8 | ⋮ | ⋮ |
| 9 | ⋮ | ⋮ |
| 10 | ⋮ | ⋮ |

| CONNECTOR ID : CC-2 | | |
|---|---|---|
| No. | PIN ID | CONNECTION-DESTINATION WIRE |
| 1 | C-11a | W-11a |
| 2 | C-11b | W-11b |
| 3 | C-11c | W-11c |
| 4 | C-21a | W-21a |
| 5 | C-21b | W-21b |
| 6 | C-21c | W-21c |
| 7 | C-21d | W-21d |
| 8 | ⋮ | ⋮ |
| 9 | ⋮ | ⋮ |
| 10 | ⋮ | ⋮ |

METHOD FOR MANUFACTURING A WIRE HARNESS

BACKGROUND OF THE INVENTION

Field of the Invention

The present invention relates to a system that supports efficient manufacturing of a wire harness.

Description of the Related Art

For example, in a system in which an input device, a control device, and an output device are connected together via a wire harness (sometimes referred to simply as a harness below), the harness is sometimes manufactured in a different place before the system is assembled. To manufacture the harness, work is normally performed in which a plurality of electric wires are wired at predetermined positions and bound into a bundle, and each of the electric wires included in the bundle is then connected to a corresponding terminal of an electrical connector. Note that the wiring of the electric wires described above means arrangement of the electric wires at required positions.

When the system becomes large-scaled, and the number of the harnesses is increased, the numbers of the electric wires and the connectors constituting the harnesses are correspondingly increased. It thus takes much time to manufacture the harnesses. The harness means an assembly composed of the connector and the electric wire bundle in which the plurality of electric wires are bound together.

Japanese Patent Laid-Open No. 2012-252977 discloses a manufacturing system that can manufacture a wire harness at low cost by reducing a distribution cost of an exterior member. In the system in Japanese Patent Laid-Open No. 2012-252977, an electric wire body included in the wire harness that is a manufacturing object is divided into three types of portions including a trunk portion as a main portion, and a branch portion and a distal end portion that are spread therefrom in a substantially hierarchical manner. That is, in Japanese Patent Laid-Open No. 2012-252977, the types of exterior members required for assembling the wire harness are reduced, so that equipment for manufacturing the exterior members required for assembling the wire harness can be provided in a single plant. Japanese Patent Laid-Open No. 2012-252977 thereby achieves its object. As described above, Japanese Patent Laid-Open No. 2012-252977 makes no mention of efficient wiring of electric wires, and connection of wired electric wires and a connector.

An object of the present invention is to provide a wire harness manufacturing support system that enables efficient wiring of electric wires, and further enables efficient connection of wired electric wires and a connector.

SUMMARY OF THE INVENTION

A wire harness manufacturing support system of the present invention includes: a worktable on which a plurality of electric wires constituting a wire harness are wired; and a database that holds wiring route data corresponding to each wire of the plurality of electric wires. The manufacturing support system is configured so that wiring routes are displayed on the worktable based on the plurality of wiring route data held in the database.

In the manufacturing support system of the present invention, the plurality of wiring routes may be sequentially displayed on the worktable in increments of the same wiring route.

In the manufacturing support system of the present invention, the database may hold connection relationship data of a plurality of electrical connectors corresponding to each wire of the plurality of electric wires, and display a connection relationship between the electric wire and the electrical connector corresponding to each other on the worktable based on the connection relationship data held in the database.

In the manufacturing support system of the present invention, the connection relationship between the electric wire and the electrical connector may be displayed close to a position where the electric wire and the electrical connector are connected together.

In the manufacturing support system of the present invention, the worktable may have a function of displaying an image by itself.

In accordance with the wire harness manufacturing support system of the present invention, the wiring routes of the electric wires constituting the wire harness to be manufactured are sequentially displayed on the worktable on which a wiring work of the electric wires is performed. Thus, the route in which each electric wire is to be wired can be recognized at a glance, and it is not necessary to select the route in which the electric wire is to be wired from many wiring routes. Therefore, in accordance with the manufacturing support system of the present invention, it is possible to efficiently manufacture the wire harness.

Moreover, in accordance with the manufacturing support system of the present invention, the connection relationship between the electric wire and the electrical connector to be connected together is also displayed in a connecting work of the connector to the electric wire. It is thus not necessary to select a connection destination of the electrical connector. Therefore, a manufacturing period of the wire harness including the connecting work of the connector can be significantly reduced.

DETAILED DESCRIPTION OF THE PREFERRED EMBODIMENT

In the following, a preferred embodiment of the present invention will be described by reference to the drawings.

Figure 1:
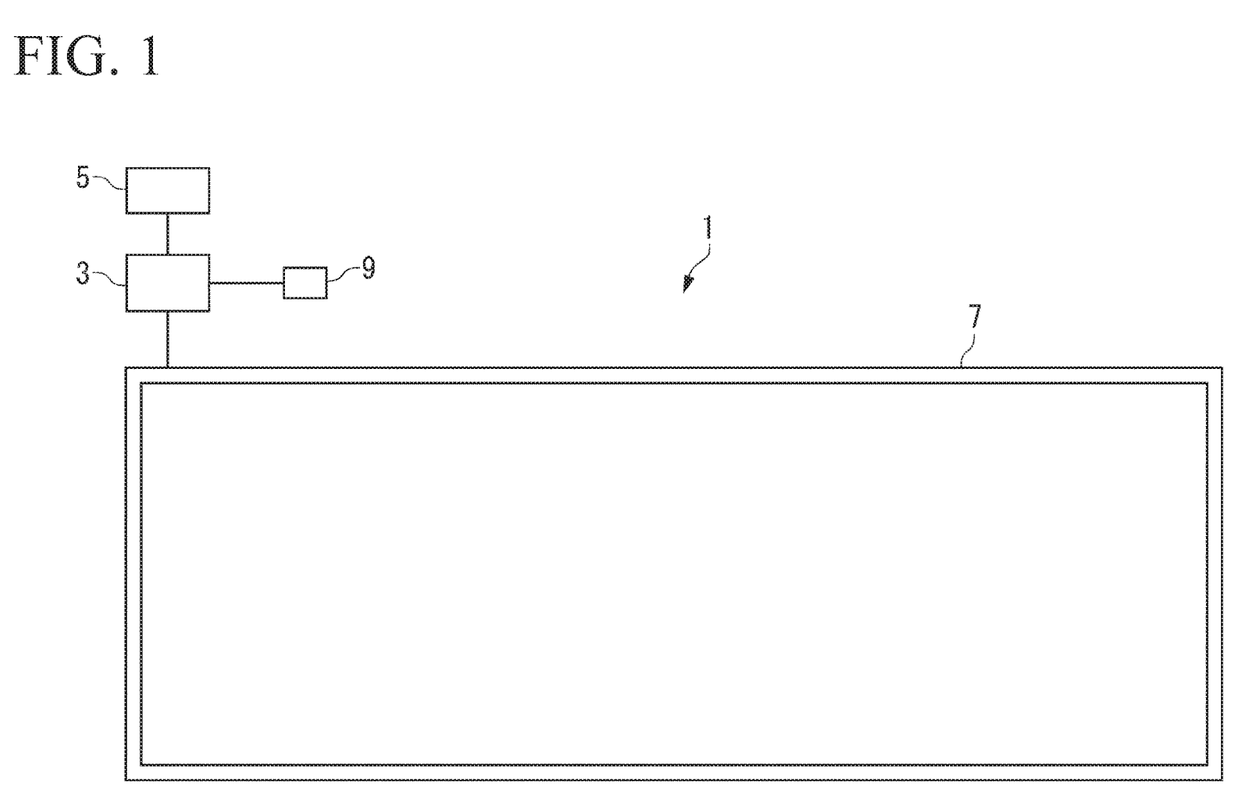
FIG. 1 is a view illustrating a configuration outline of a wire harness manufacturing support system of a present embodiment.
Figure 2:
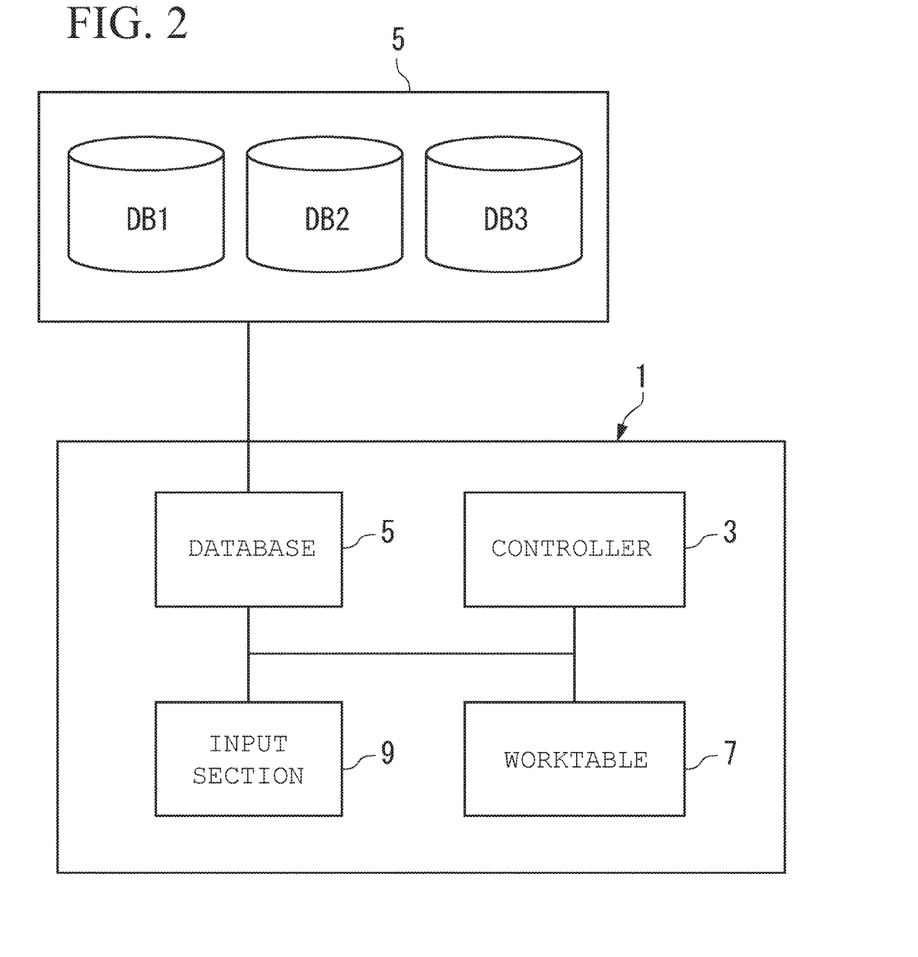
FIG. 2 is a view illustrating functional blocks of the manufacturing support system in FIG. 1.

A wire harness manufacturing support system 1 of the present embodiment includes a controller 3, a database 5, a worktable 7, and an input section 9 as shown in FIGS. 1 and 2. When identification information of a wire harness to be manufactured is inputted into the input section 9, the manufacturing support system 1 sequentially displays positions where individual electric wires constituting the wire harness are to be wired, that is, wiring routes, and subsequently displays a relationship between the individual electric wires and pins of an electrical connector (referred to simply as a connector below) to be connected to the individual electric wires, that is, connector connection information on the worktable 7. An operator who manufactures the wire harness wires the electric wires on a surface of the worktable 7, and subsequently connects the connector to the electric wires according to the displayed contents to manufacture the wire harness.

Although minimum numbers of wire harnesses, electric wires, and connectors required for describing one example of the present invention are employed in the following description, the present invention can be applied to a large number of wire harnesses or the like in reality.

The controller 3 controls an operation of the manufacturing support system 1. When identification information ID_WH of a wire harness is inputted from the input section 9, the controller 3 reads out wiring information of electric wires and connection information of a connector corresponding to the identification information ID_WH from the database 5. The controller 3 instructs the worktable 7 to display wiring routes of the electric wires, and connection information between the electric wires and the connector based on the read-out wiring information and connection information.

The controller 3 can be composed of a personal computer, or other computer devices. The computer device is equipped with a display such as a liquid crystal display device.

As shown in FIG. 2, the database 5 includes a first storage section DB1 that previously stores the identification information ID_WH of wire harnesses belonging to a formboard regarding the wire harness that is a manufacturing object, a second storage section DB2 that previously stores the wiring information of electric wires, and a third storage section DB3 that previously stores the connection information of connectors. Here, the formboard is a diagram that can be called a plan drawing where wiring routes of electric wires required for manufacturing a wire harness, a connection relationship between electric wires and a connector, or the like are shown.

Figure 3:
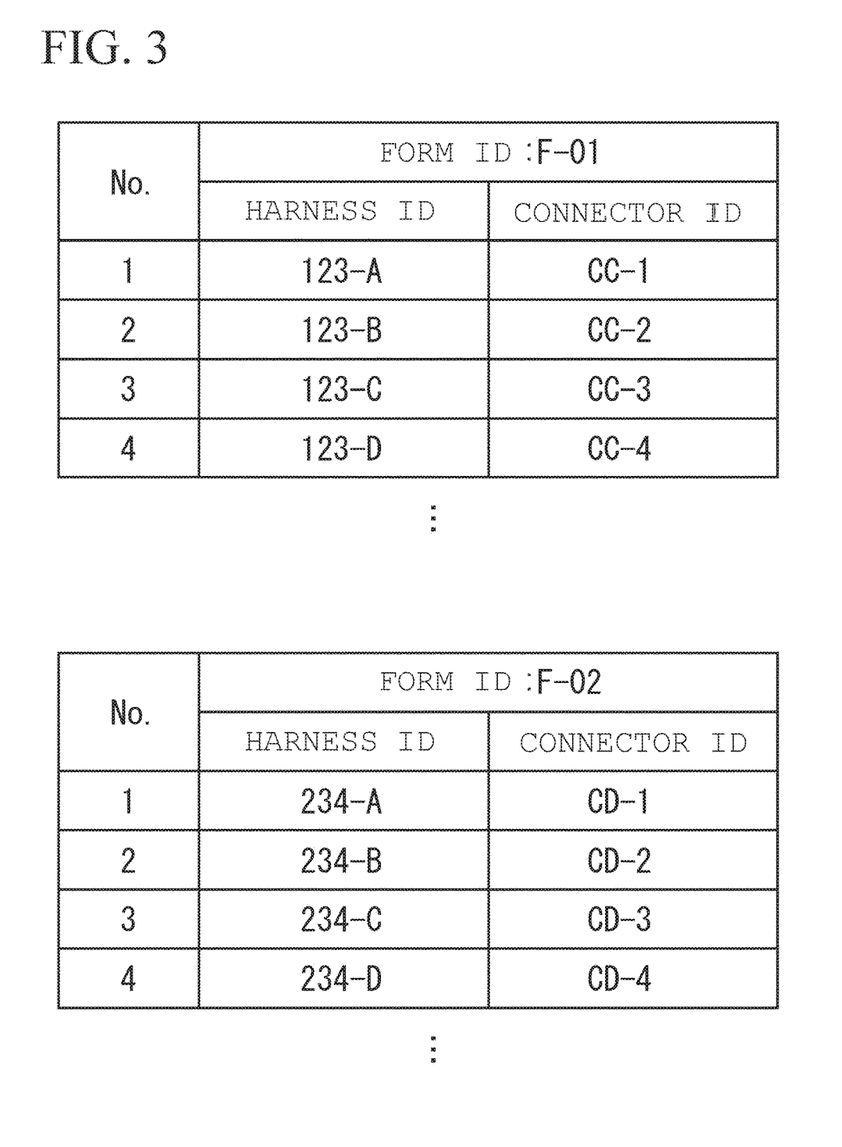
FIG. 3 is a view illustrating one example of identification information of wire harnesses stored in a first storage section DB1 in FIG. 2.

FIG. 3 shows one example of the identification information ID_WH of the wire harnesses belonging to the formboard stored in the first storage section DB1. In the example, a formboard whose identification information (form ID) is F01, and wire harnesses belonging to the formboard and whose identification information (harness IDs) are 123-A, 123-B, 123-C, and so on are associated together, and a formboard whose form ID is F02, and wire harnesses belonging to the formboard and whose harness IDs are 234-A, 234-B, 234-C, and so on are associated together. Identification information (connector ID) of a connector corresponding to each of the harness IDs is also stored in the first storage section DB1 as shown in FIG. 3. Therefore, when a form ID is selected, harness IDs belonging to a formboard F having the form ID can be identified, and connector IDs belonging to the harness IDs can be also identified.

Figure 4:
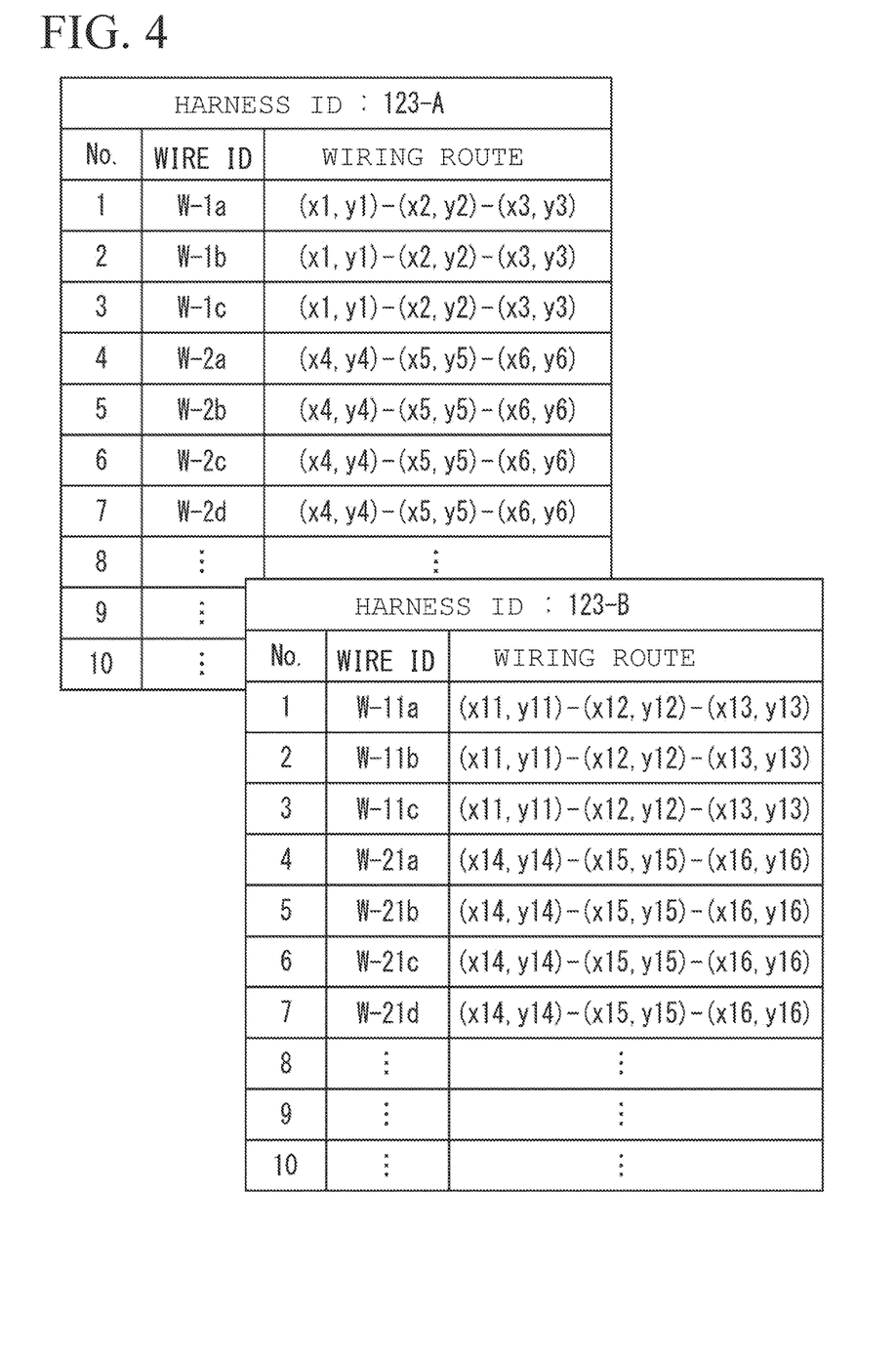
FIG. 4 is a view illustrating one example of wiring information stored in a second storage section DB2 in FIG. 2.

FIG. 4 shows one example of wiring information WI stored in the second storage section DB2. The example shows the wiring information of two wire harnesses: a wire harness whose harness ID is 123-A, and a wire harness whose harness ID is 123-B. The wiring information is information in which information (wire ID) for identifying each electric wire and a wiring route of the electric wire are associated with each other. When a wire ID is selected, a wiring route of an electric wire having the wire ID can be identified.

The wiring route is obtained by considering the worktable 7 as a two-dimensional coordinate system, and representing optional positions of the worktable 7 by a combination of (x0, y0) to (xn, yn).

For example, in the wire harness whose harness ID is 123-A, a wiring route of an electric wire whose wire ID is W-1a is identified by (x1, y1)-(x2, y2)-(x3, y3). In the wire harness whose harness ID is 123-B, a wiring route of an electric wire whose wire ID is W-11a is identified by (x11, y11)-(x12, y12)-(x13, y13). The former wiring route indicates that a start point position is (x1, y1), an end point position is (x3, y3), and a transit position is (x2, y2). The latter wiring route indicates that a start point position of the electric wire is (x11, y11), an end point position is (x13, y13), and a transit position is (x12, y12).

Note that a wiring route identified by two position coordinates indicates that the wiring route is a straight line, and a wiring route identified by three or more position coordinates indicates that the wiring route includes a bent portion.

Also, electric wires in the same wiring route belong to the same bundle in a wire harness. For example, W-1a, W-1b, and W-1c belong to the same bundle.

Figure 5:
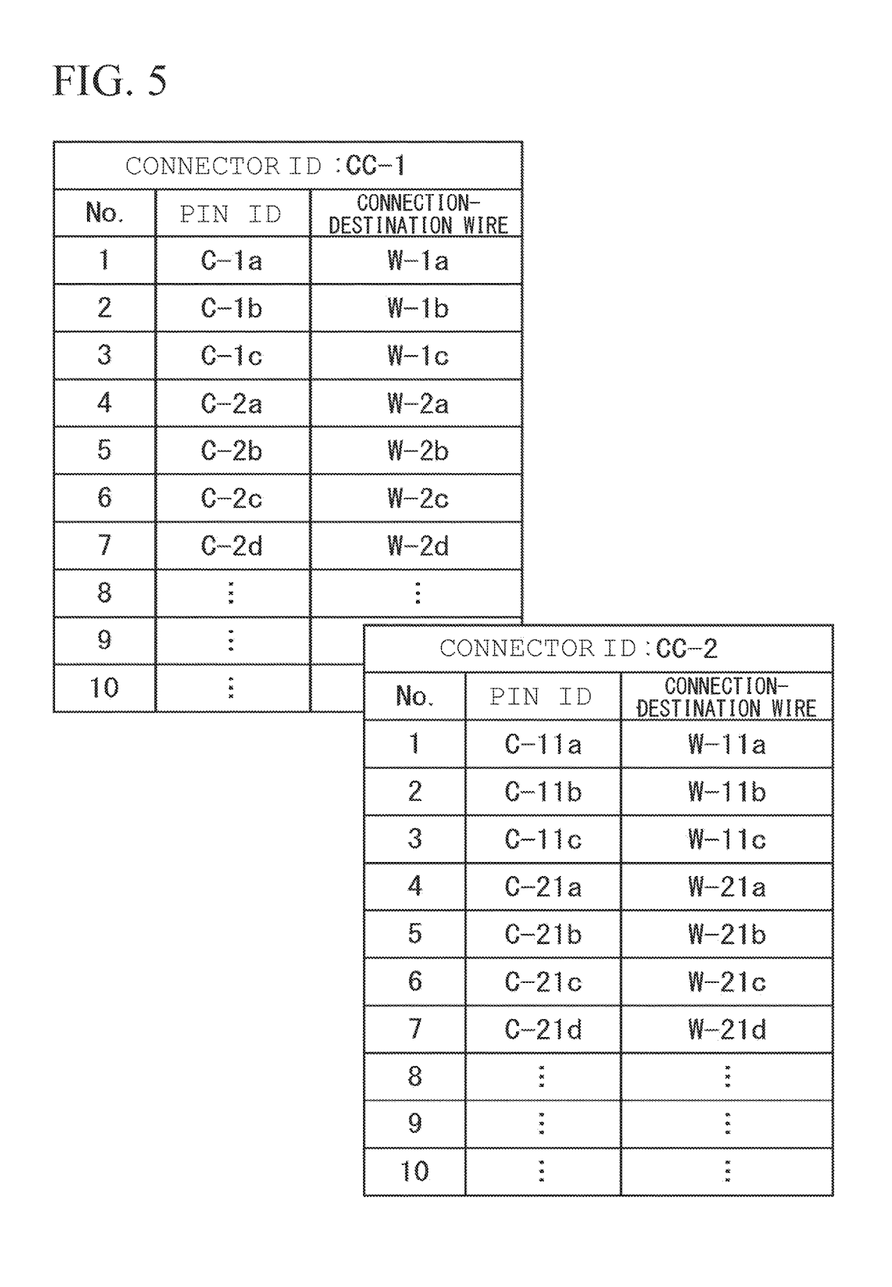
FIG. 5 is a view illustrating one example of connection information stored in a third storage section DB3 in FIG. 2.

FIG. 5 shows one example of the connection information stored in the third storage section DB3. The example shows the connection information of two connectors: a connector whose identification information (connector ID) is CC-1, and a connector whose connector ID is CC-2. The connection information is information in which information (pin ID) for identifying a pin provided in each connector and identification information of an electric wire connected to the pin (a connection-destination wire) are associated with each other. When a pin ID is selected, an electric wire connected to a pin having the pin ID is identified.

The wiring information stored in the second storage section DB2, and the connection information stored in the third storage section DB3 are read out by the controller 3 during a manufacturing work of the wire harness. Based on the information, contents for supporting a wiring work and a connector connecting work are displayed on the worktable 7.

Next, the worktable 7 displays the wiring routes of the respective electric wires constituting the wire harness based on the wiring information read out from the database 5 by the controller 3. The worktable 7 also displays a connection relationship between the respective electric wires constituting the wire harness and the pins of the connector connected thereto based on the connection information read out from the database 5 by the controller 3. In the following, a description will be made by reference to FIGS. 6A-6C and 7.

Figure 6A:
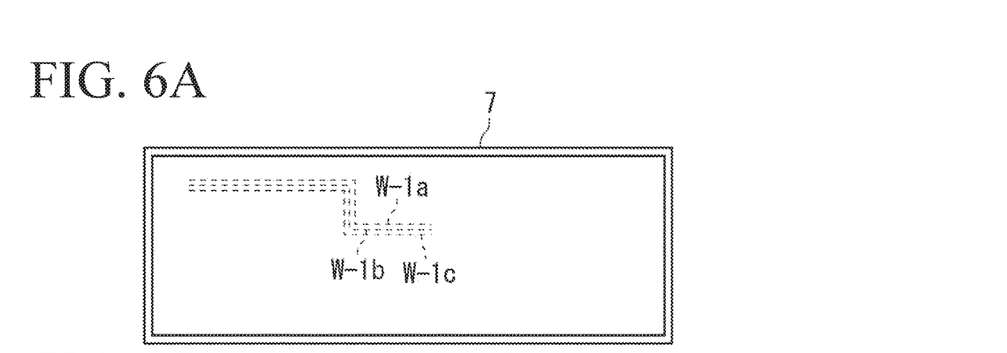
FIGS. 6A-6C are views illustrating display examples of a wiring route displayed on a worktable in FIG. 1.
Figure 6B:
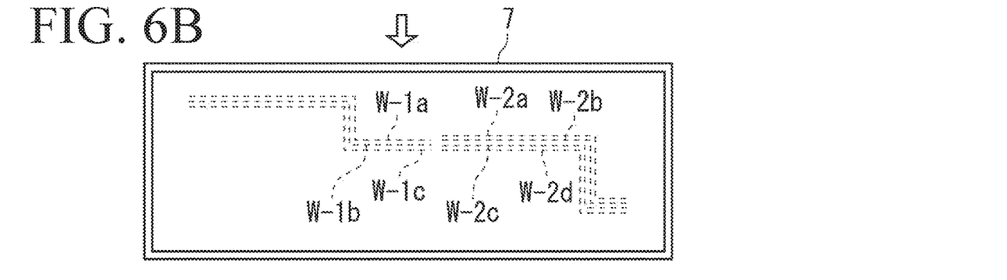
Figure 6C:
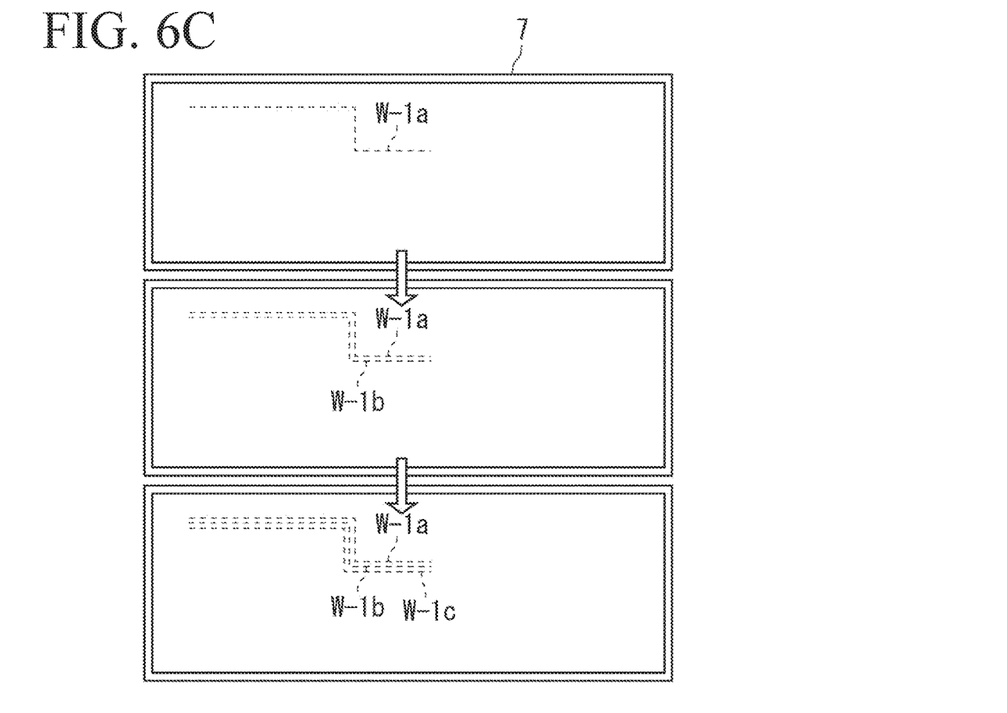

The wiring routes of the electric wires are displayed on the worktable 7 as shown in FIGS. 6A-6C. Here, the wiring routes are indicated by dashed lines. This is to discriminate the wiring routes from electric wires indicated by solid lines as described later.

FIG. 6A shows a wiring route of three electric wires W-1a, W-1b, and W-1c of the wire harness having a harness ID of 123-A shown in FIG. 4. Next, FIG. 6B shows a wiring route of next four electric wires W-2a, W-2b, W-2c, and W-2d of the wire harness having a harness ID of 123-A shown in FIG. 4. As described above, the electric wires are sequentially displayed on the worktable 7 in increments of the electric wires belonging to the same wiring route, that is, the same bundle. Although the three electric wires W-1a, W-1b, and W-1c are displayed on the worktable 7 at the same time, the three electric wires W-1a, W-1b, and W-1c may be sequentially displayed as shown in FIG. 6C. Although not shown in the drawings, the wiring routes of all the electric wires W-1a, W-1b, W-1c, W-2a, W-2b, W-2c, and W-2d may be displayed on the worktable 7 at the same time.

Figure 7:
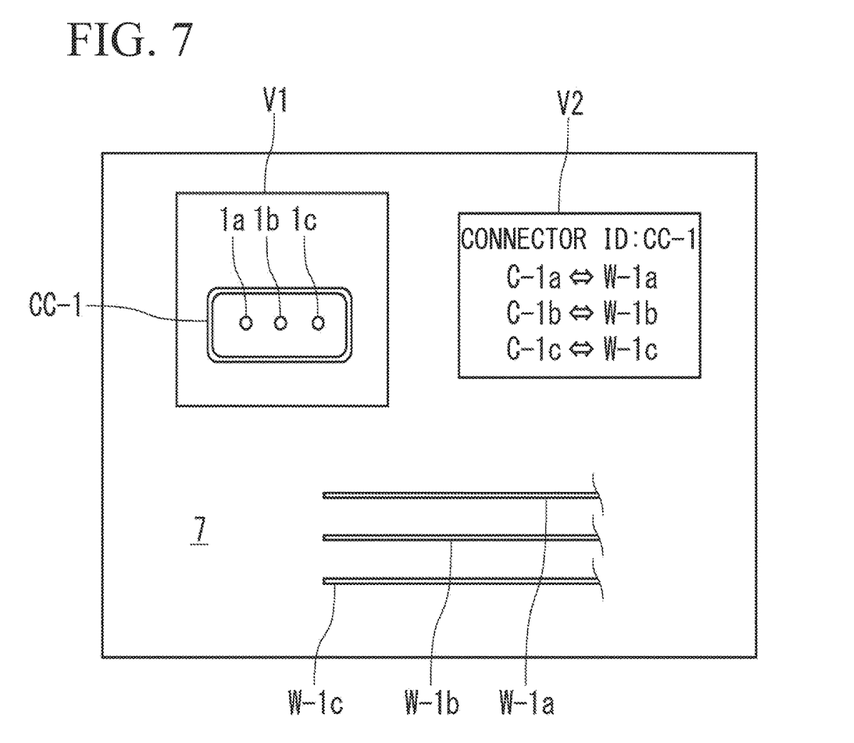
FIG. 7 is a view illustrating a display example of connection information displayed on the worktable in FIG. 1.

Next, FIG. 7 shows a display example of the connection relationship (the connection information) of the pins of the connector corresponding to the respective electric wires. The display example includes a connector image V1 in which an image of the connector CC-1 including three pins 1a, 1b, and 1c is displayed, and an association indication V2 in which the three pins 1a, 1b, and 1c and the three electric wires W-1a, W-1b, and W-1c connected thereto, respectively, are displayed in association with each other.

The electric wires W-1a, W-1b, and W-1c in solid lines shown below the connector image V1 and the association indication V2 indicate actual electric wires that have already been wired. The connector image V1 and the association indication V2 are displayed close to a position where the connector is actually connected, and an operator can perform a connecting work between each of the electric wires W-1a, W-1b, and W-1c, and each of the pins 1a, 1b, and 1c of the connector CC-1 while referring to the information.

Contents similar to the connector image V1 and the association indication V2 described above are displayed close to a connection position between other electric wires and a connector.

The input section 9 is a portion into which identification information ID_F of a formboard that is a work object is inputted. When the identification information ID_F inputted from the input section 9 is given to the controller 3, the controller 3 reads out the required wiring information and connection information from the database 5 based on the identification information ID_F.

For example, a keyboard used for a computer device can be employed as the input section 9. In this case, an operator types the identification information ID_F to the keyboard. A reader for a coded identification information source such as a one-dimensional code and a two-dimensional code may be also used as the input section 9. In this case, a one-dimensional code or a two-dimensional code in which information for identifying the formboard is described is prepared, and when the wire harness is manufactured, the reader that functions as the input section 9 reads out the identification information. Any other means for inputting the identification information ID_F may be employed.

A procedure for manufacturing a wire harness WH by using the manufacturing support system 1 having the above configuration will now be described by reference to FIGS. 8 to 13C. A series of procedure steps are divided into wiring steps and connector connecting steps. Also, the procedure described below employs procedure steps in which all the electric wires constituting the wire harness are wired, the wired electric wires are bound together, and the connector is then connected.

[Wiring Steps]

Figure 8:
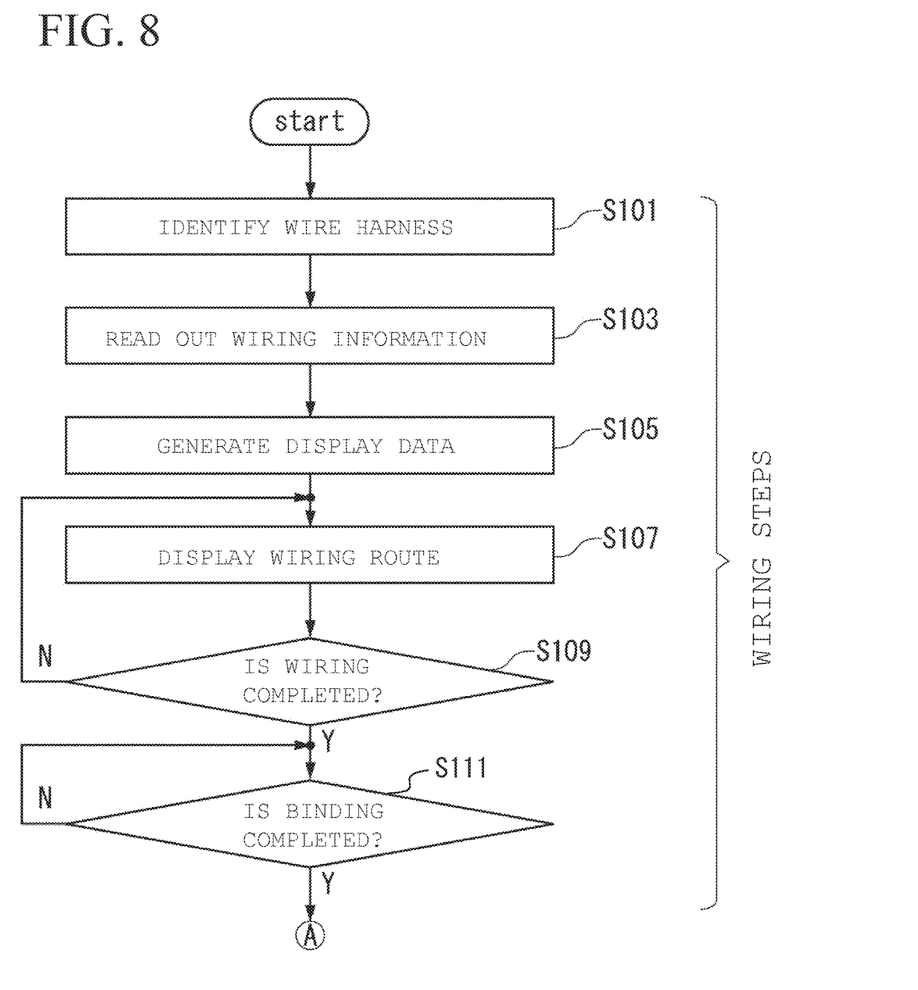
FIG. 8 is a view illustrating a procedure of wiring steps in the manufacturing support system in FIG. 1.

In the manufacturing support system 1, when the identification information ID_F of the formboard including the wire harness that is a manufacturing object is inputted into the input section 9, the controller 3 identifies the identification information ID_WH of the wire harnesses included in the formboard by referring to the first storage section DB1 of the database 5 (FIG. 8, S101). Here, F-01 shown in FIG. 3 falls under the form ID, and 123-A, 123-B, 123-C, 123-D, and so on fall under the harness ID. Here, 123-A is selected. That is, in some cases, there are restrictions on working hours, or a work target is not a complete end product. It is possible to select a single or a plurality of harness IDs according to a working process in each case.

Subsequently, the controller 3 reads out the wiring information of all the electric wires constituting the wire harness identified by the harness ID of 123-A by referring to the second storage section DB2 of the database 5 (FIG. 8, S103).

The controller 3 generates display data of the wiring routes to be displayed as an image on the worktable 7 based on the read-out wiring information (FIG. 4) (FIG. 8, S105), and subsequently displays the wiring routes on the worktable 7 based on the display data (FIG. 8, S107). The wiring routes are displayed on the worktable 7. Here, the wiring route of the three electric wires W-1a, W-1b, and W-1c is displayed, and the wiring route of the four electric wires W-2a, W-2b, W-2c, and W-2d is subsequently displayed in turn as shown in FIGS. 6A and 6B.

Figure 10A:
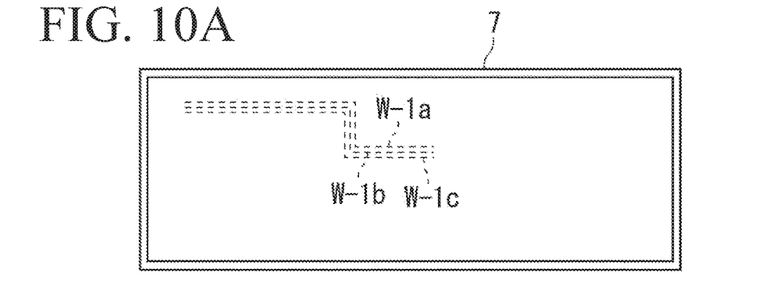
FIGS. 10A-10D are views sequentially illustrating working steps for manufacturing a wire harness by using the manufacturing support system in FIG. 1.
Figure 10B:
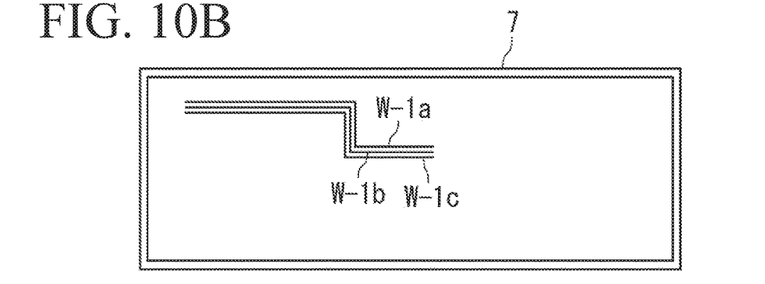

When the wiring route of the three electric wires W-1a, W-1b, and W-1c is displayed as shown in FIG. 10A, an operator actually wires the three electric wires W-1a, W-1b, and W-1c according to the wiring route as shown in FIG. 10B. The actual electric wires are indicated by solid lines.

Figure 10C:
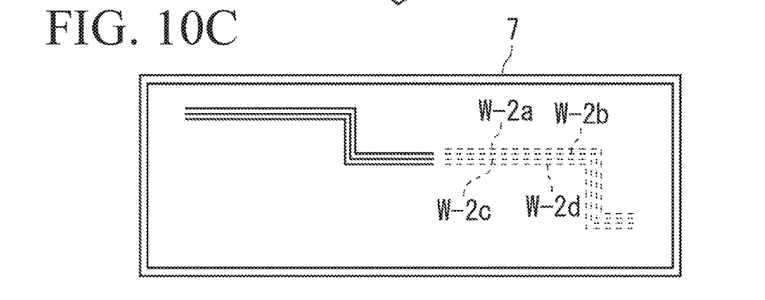
Figure 10D:
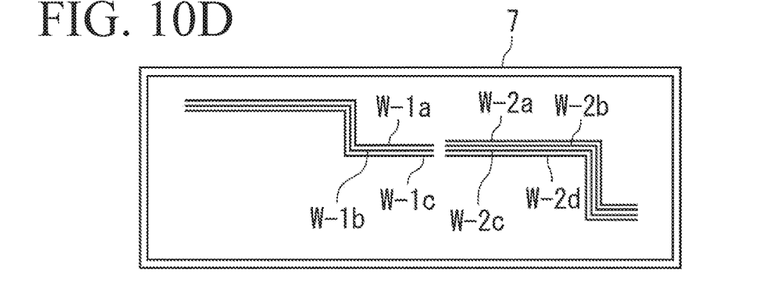
Figure 12A:
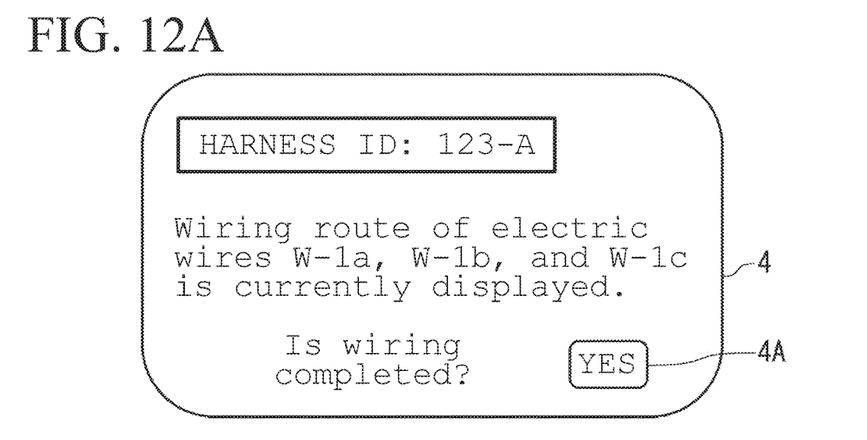
FIGS. 12A-12C are views illustrating guidance in the wiring steps.
Figure 12B:
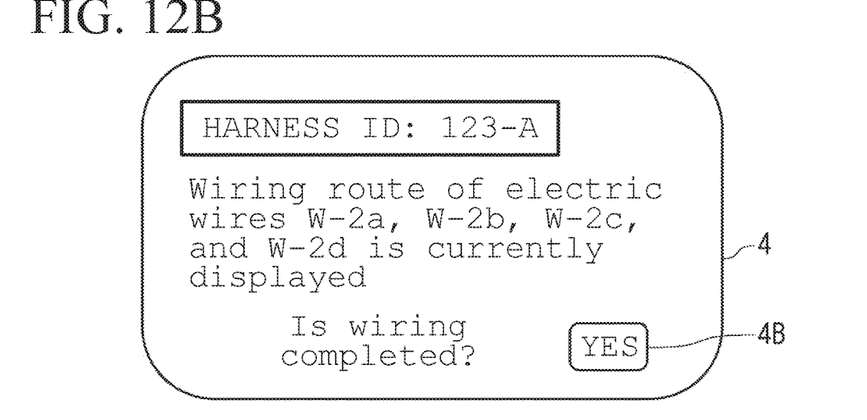

At this time, a display 4 provided in the controller 3 can display that the wiring route of the electric wires W-1a, W-1b, and W-1c is displayed on the worktable 7 as shown in FIG. 12A. The operator can confirm the electric wires W to be wired by referring to the displayed contents in the display 4. The displayed contents include an icon 4A for informing the controller 3 that the wiring is completed. When the operator clicks the icon 4A, the controller 3 recognizes that the wiring of the electric wires W-1a, W-1b, and W-1c has been completed. The controller 3 then displays the wiring route of the four electric wires W-2a, W-2b, W-2c, and W-2d on the worktable 7 as shown in FIG. 10C. At this time, the display 4 can display that the wiring route of the electric wires W-2a, W-2b, W-2c, and W-2d is displayed on the worktable 7 as shown in FIG. 12B. The operator actually wires the four electric wires W-2a, W-2b, W-2c, and W-2d according to the wiring route as shown in FIG. 10D. When the wiring work is completed, the operator clicks an icon 4B.

Figure 11A:
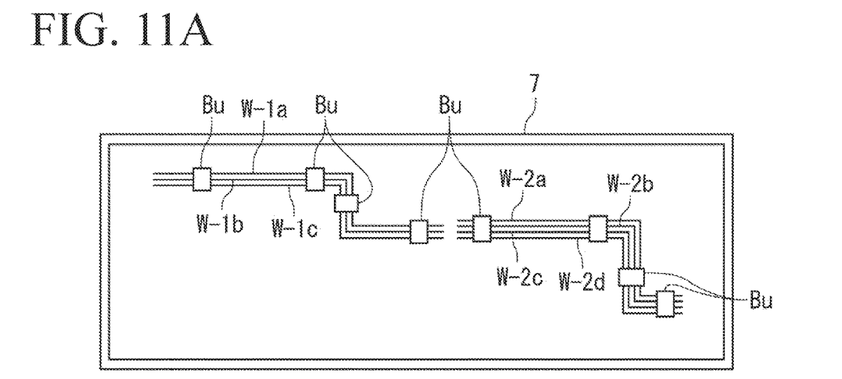
FIGS. 11A, 11B are views sequentially illustrating working steps subsequent to FIG. 10D.
Figure 12C:
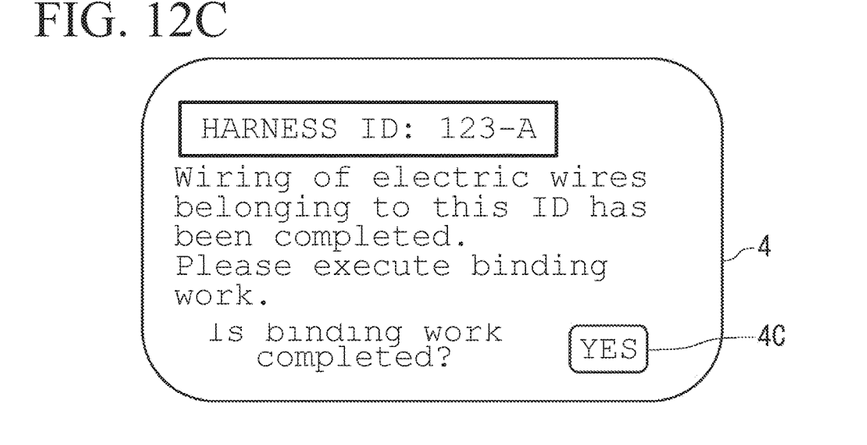

It is assumed that the wiring of all the electric wires required for manufacturing the wire harness is completed by the completion of the wiring of the electric wires W-1a, W-1b, and W-1c, and the wiring of the electric wires W-2a, W-2b, W-2c, and W-2d. In this case, when the icon 4B in FIG. 12B is clicked, the controller 3 confirms that the wiring of all the electric wires has been completed (FIG. 8, S109, Y), and subsequently controls the display 4 to display an instruction to perform a binding work of binding the wired electric wires as shown in FIG. 12C. When the operator finishes the binding work of the electric wires W by using binding members Bu as shown in FIG. 11A, the operator clicks an icon 4C in FIG. 12C. Accordingly, the controller 3 recognizes that the wiring steps including the binding work have been completed (FIG. 8, S111, Y), and moves to the subsequent connector connecting steps.

[Connector Connecting Steps]

Figure 9:
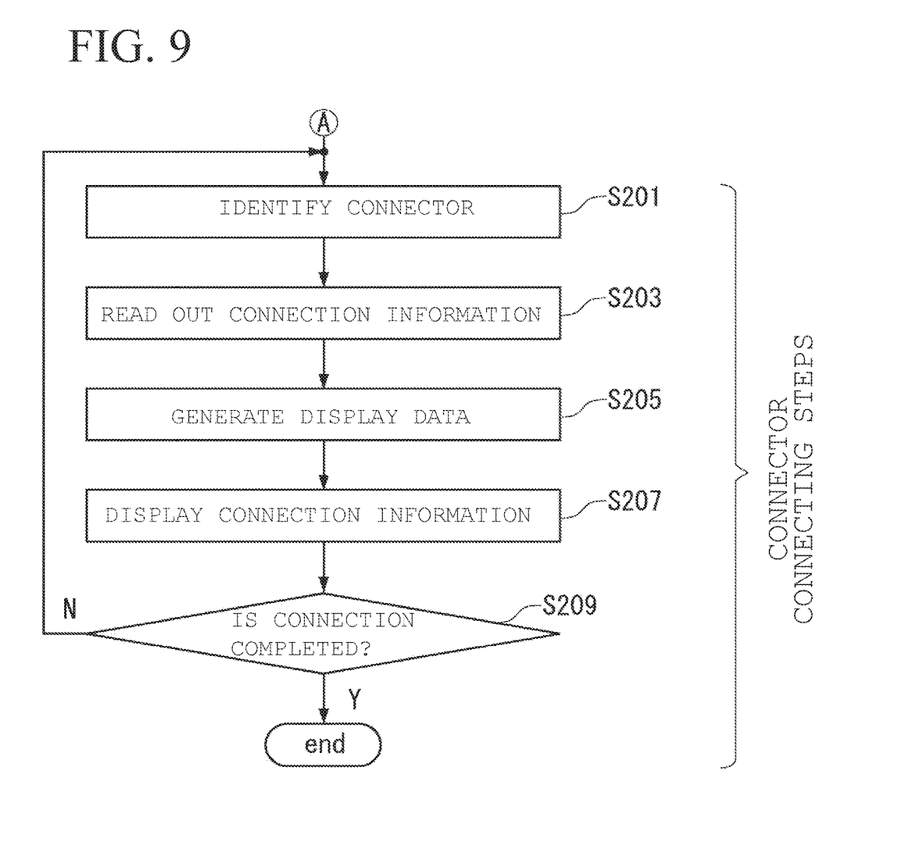
FIG. 9 is a view illustrating a procedure of connector connecting steps in the manufacturing support system in FIG. 1.

The controller 3 identifies identification information ID_C of the connector corresponding to the wire harness in which the wiring has been completed by referring to the first storage section DB1 of the database 5 (FIG. 9, S201). Here, CC-1 and CC-2 shown in FIG. 3 fall under the identification information ID_C. Note that the connector can be selected in the connector connecting steps similarly to the setting of the harness ID.

Subsequently, the controller 3 reads out the connection information that is association information between all the pins constituting the connectors identified by CC-1 and CC-2 as the identification information ID_C, and the identification information of the electric wires as connection partners (the connection-destination wires) by referring to the third storage section DB3 of the database 5 (FIG. 9, S203).

The controller 3 generates display data regarding connector connection to be displayed on the worktable 7 (FIG. 9, S205) based on the read-out respective connection information (FIG. 5), and subsequently displays the connection information on the worktable 7 based on the display data (FIG. 9, S207). The display example is shown in FIG. 7. The operator performs a work of connecting the three electric wires W-1a, W-1b, and W-1c to the respective corresponding pins of the connector CC-1 while referring to the displayed contents.

Figure 13A:
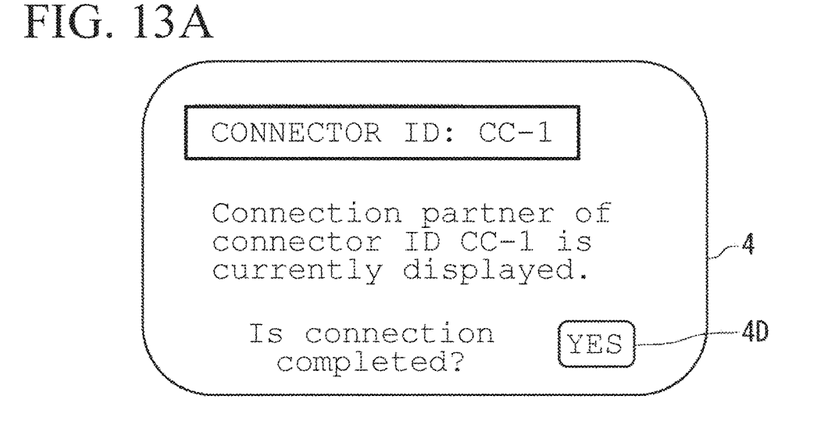
FIGS. 13A-13C are views illustrating guidance in the connector connecting steps.
Figure 13B:
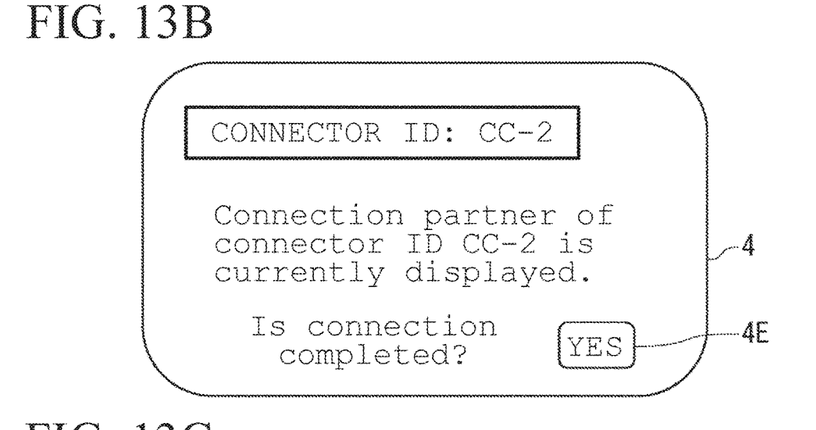

At this time, the display 4 provided in the controller 3 can display that the connection information of the connector CC-1 is displayed on the worktable 7 as shown in FIG. 13A. The operator can confirm the connector to be connected by referring to the displayed contents in the display 4. The displayed contents include an icon 4D for informing the controller 3 that the connecting work of the connector CC-1 is completed. When the operator clicks the icon 4D, the controller 3 recognizes that the connection of the connector CC-1 has been completed. At this time, the display 4 can display that the connection information of the connector CC-2 is displayed on the worktable 7 as shown in FIG. 13B. As described above, the operator advances the connecting work of a connector CC-n required for the wire harness that is a manufacturing object. When the connecting work is completed, the operator clicks an icon 4E.

Figure 11B:
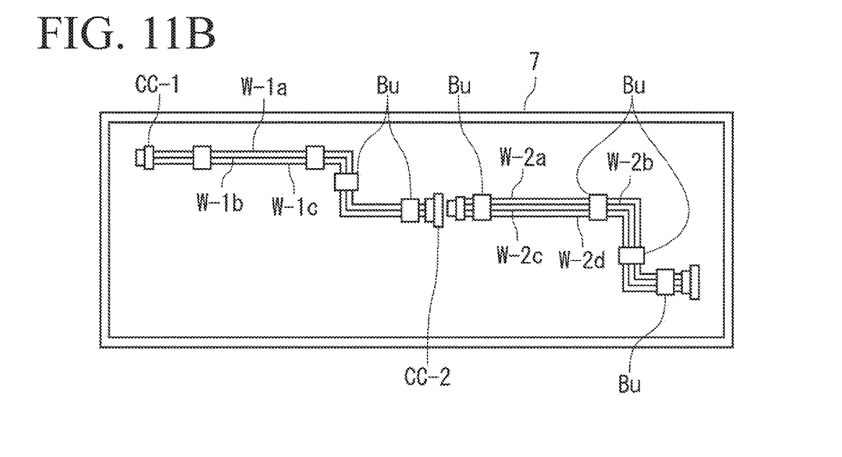
Figure 13C:
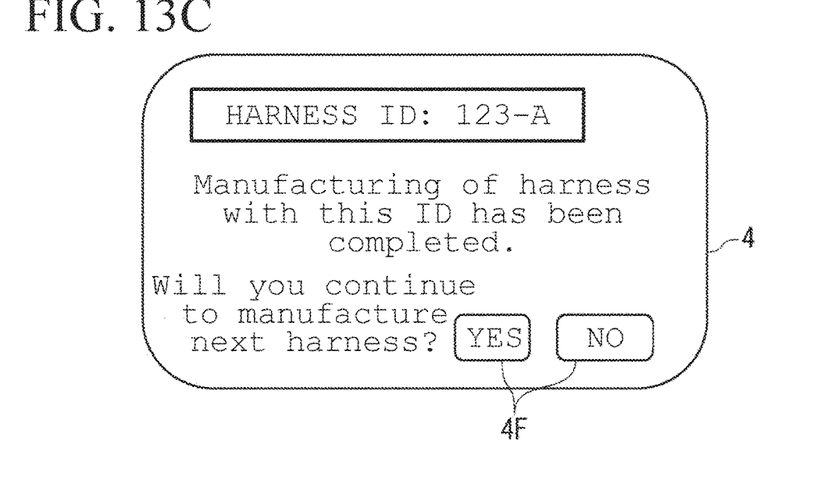

When the icon 4E in FIG. 13B is clicked, the controller 3 confirms that the connection of all the connectors has been completed as shown in FIG. 11B (FIG. 9, S209, Y), and subsequently controls the display 4 to display that the manufacturing of the wire harness including the connection of the connectors is completed as shown in FIG. 13C. The controller 3 also controls the display 4 to display an icon 4F for inquiring whether a next wire harness is to be manufactured. When "YES" is clicked, the manufacturing of the next wire harness is supported in the same procedure as that described above.

[Effect]

As described above, in accordance with the manufacturing support system 1, the wiring routes of the electric wires constituting the wire harness to be manufactured are sequentially displayed on the worktable 7 on which the electric wires are wired. Thus, the route in which each electric wire is to be wired can be recognized at a glance, and it is not necessary to select the route in which the electric wire is to be wired from many wiring routes. Therefore, in accordance with the manufacturing support system 1, the operator only needs to wire the electric wires according to the wiring routes displayed on the worktable 7. Consequently, it is possible to efficiently manufacture the wire harness.

Moreover, in accordance with the manufacturing support system 1, the connection information of the connector is also displayed on the worktable 7 close to the electric wires to which the connector is to be connected in the connecting work of the connector to the electric wires. It is thus not necessary to select the connection destination of the connector. Therefore, a manufacturing period of the wire harness including the connecting work of the connector can be significantly reduced.

Also, in accordance with the manufacturing support system 1, even when a different type of wire harness is manufactured, a required wiring route and required connection information CI can be displayed without performing an extra work such as replacement of the worktable 7 when information corresponding to each wire harness is previously stored in the database 5. The manufacturing support system 1 contributes to reducing the manufacturing period of the wire harness from this point as well.

The manufacturing support system 1 can move to the connector connecting steps after confirming that the wiring steps have been completed, and can further confirm that the connector connecting steps have been completed. The manufacturing support system 1 can thus effectively prevent skipping of the wiring of the electric wires and the connection of the connectors.

Although the preferred embodiment of the present invention has been described above, the present invention is not limited thereto.

Figure 14A:
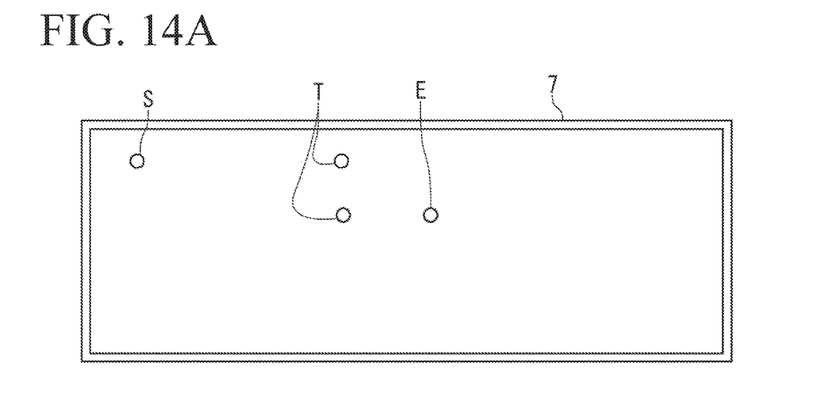
FIGS. 14A, 14B are views illustrating a modification of the present embodiment.

For example, the wiring route is continuously displayed from the start point to the end point in the above embodiment. However, a wiring route composed of a start point S and an end point E, or a wiring route composed of the start point S, a transit point T, and the end point E may be displayed as shown in FIG. 14A. To be more specific, an equipment capable of performing projection mapping on a three-dimensional structure that simulates a wiring route in which a harness is actually laid may be employed.

Figure 14B:
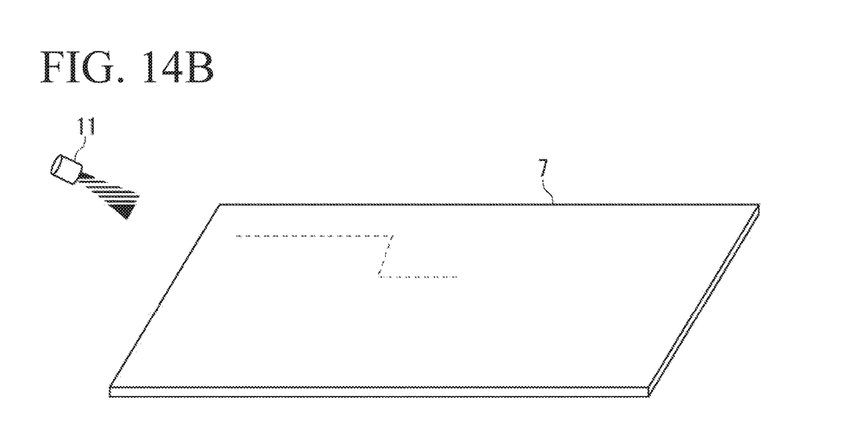

Also, the worktable 7 is provided with the function of generating the display image, and the worktable 7 displays the wiring routes and the connector connection information by itself in the above embodiment. However, the worktable 7 may be provided with only a function as a screen. In this case, an equipment 11 that projects displayed contents to the worktable 7 that functions as a screen may be provided separately from the worktable 7 as shown in FIG. 14B. For example, a projector can be used as the equipment. In the present invention, any other equipment that can sequentially display the wiring routes and the connector connection information can be used.

Although the manufacturing support system 1 previously stores the identification information ID_WH of the wire harnesses or the like in the database 5, information stored in a different data storage medium from the database 5 may be downloaded into the database 5 before the manufacturing work of the wire harness is started. That is, in the present invention, it is only necessary that the data is held in the storage portion of the manufacturing support system at the time of the manufacturing work.

Also, although the manufacturing support system 1 sequentially displays the wiring routes on the worktable 7 in increments of the electric wire bundle, the present invention is not limited thereto. The wiring routes may be sequentially displayed on the worktable 7 in increments of the connector. In short, the present invention may reduce a burden as compared to a case in which all the wiring routes are displayed at a time and the wiring route of the electric wire is found out from the wiring routes.

The manufacturing support system 1 is preferably used for manufacturing a large number of wire harnesses, which are for example mounted on an aircraft.

What is claimed is:

1. A method for manufacturing a wire harness, the method using a worktable on which a plurality of electric wires constituting the wire harness are wired, and the method comprising the steps of:
   reading out wiring route data corresponding to each wire of the plurality of electric wires, and connection relationship data of a plurality of electrical connectors corresponding to each wire of the plurality of electric wires, from a database;
   sequentially displaying wiring routes based on the wiring route data on the worktable;
   displaying a connection relationship between an electric wire and an electrical connector connected to each other on the worktable based on the connection relationship data; and
   wiring the plurality of electric wires constituting the wire harness, while at least one of the wiring routes is displayed on the worktable.

2. The method for manufacturing a wire harness according to claim 1, further comprising a step of:
   connecting one of the electrical connectors to one of the wired electric wires, while the connection relationship information is displayed on the worktable, thereby manufacturing the wire harness.

3. The method for manufacturing a wire harness according to claim 2, wherein the wire harness is configured for use on an aircraft.

4. The method for manufacturing a wire harness according to claim 1, wherein the plurality of wiring routes are sequentially displayed on the worktable in increments of the same wiring route.

5. The method for manufacturing a wire harness according to claim 4, wherein the worktable is configured to display an image by itself.

6. The method for manufacturing a wire harness according to claim 1, wherein the connection relationship is displayed close to a position where the electric wire and the electrical connector are connected together.

7. The method for manufacturing a wire harness according to claim 1, wherein the worktable is configured to display an image by itself.

8. The method for manufacturing a wire harness according to claim 1, wherein the steps of reading out the wiring route data from the database and sequentially displaying the wiring routes are performed by a controller.

9. The method for manufacturing a wire harness according to claim 8, wherein the controller is a computer equipped with a display.

10. The method for manufacturing a wire harness according to claim 8, wherein the wiring route data is stored in the database so as to be associated with information identifying the plurality of electric wires and information identifying the wire harness.

11. The method for manufacturing a wire harness according to claim 8, wherein the wiring route is obtained by considering the worktable as a two-dimensional coordinate system, and representing optional positions of the worktable by a combination of $(x_0, y_0)$ to $(x_n, y_n)$.

12. The method for manufacturing a wire harness according to claim 1, wherein the wiring route data is stored in the database so as to be associated with information identifying the plurality of electric wires and information identifying the wire harness.

13. The method for manufacturing a wire harness according to claim 1, wherein the wiring route is obtained by considering the worktable as a two-dimensional coordinate system, and representing optional positions of the worktable by a combination of $(x_0, y_0)$ to $(x_n, y_n)$.

* * * * *